United States Patent [19]

Spoo et al.

[11] Patent Number: 5,092,950
[45] Date of Patent: Mar. 3, 1992

[54] MOLDING METHOD USING A MANDREL STABILIZER

[75] Inventors: Kevin J. Spoo; Larry J. Walden, both of Bartlesville; Michael D. Irvine, Nowata, all of Okla.

[73] Assignee: Phillips Petroleum Company, Bartlesville, Okla.

[21] Appl. No.: 563,578

[22] Filed: Aug. 6, 1990

[51] Int. Cl.$^5$ ............................................. B32B 27/02
[52] U.S. Cl. ................................... 156/180; 156/245; 156/433; 156/441; 264/136; 425/114
[58] Field of Search ............. 264/171, 257, 258, 135, 264/136, 137, 114, 115; 425/113; 156/441, 180, 166, 242, 245, 433

[56] References Cited

U.S. PATENT DOCUMENTS

| | | | |
|---|---|---|---|
| 1,136,291 | 4/1915 | Subers | 156/441 |
| 2,236,757 | 4/1941 | Lines | 425/114 |
| 2,948,649 | 8/1960 | Panchart | 156/180 |
| 3,433,696 | 3/1969 | Michael | 156/433 |
| 3,442,738 | 5/1969 | Scott et al. | 156/441 |
| 3,532,579 | 10/1970 | Havens et al. | 156/441 |
| 3,546,325 | 12/1970 | Muller | 156/441 |
| 3,769,127 | 10/1973 | Goldsworthy et al. | 156/180 |
| 3,853,656 | 10/1974 | McNeely et al. | 156/172 |
| 4,680,224 | 7/1987 | O'Conner | 427/430.1 |
| 4,820,366 | 4/1989 | Beaver et al. | 156/433 |

Primary Examiner—Jay H. Woo
Assistant Examiner—Robert B. Davis
Attorney, Agent, or Firm—William R. Sharp

[57] ABSTRACT

A molding apparatus and method are provided for molding hollow articles. Resin impregnated fibers are passed through a mold cavity as defined by a heated die and around a mandrel which extends through the mold cavity. The mandrel is stabilized by a mandrel stabilizer fixedly positioned downstream from the inlet end of the die. The mandrel stabilizer includes a plurality of elongated members spaced around the mandrel, wherein each elongated member has an end in contact with the outer surface of the mandrel.

15 Claims, 4 Drawing Sheets

MOLDING METHOD USING A MANDREL STABILIZER

BACKGROUND OF THE INVENTION

The invention relates to an apparatus and method for molding hollow articles from resin impregnated fibers, and more particularly relates to pultrusion of such hollow articles.

It is known to pultrude hollow articles, such as tubing, by employing a die in conjunction with a mandrel, wherein the mandrel is cantilevered from a support so as to extend through a mold cavity defined within the die. Multiple resin impregnated fibers are passed through the mold cavity and around the mandrel so as to consolidate the resin impregnated fibers into the desired shape. Although hollow articles have been produced in this manner with some degree of success, further improvement would be desirable.

SUMMARY OF THE INVENTION

It is, therefore, an object of the invention to provide an improved apparatus and method for producing hollow articles.

This object is realized by a molding apparatus comprising: a die having an inlet end, an outlet end, and a mold cavity defined therein which extends from the inlet end to the outlet end; a means for heating the die; a mandrel which extends through the mold cavity from the inlet end to the outlet end; a means for passing resin impregnated fibers through the mold cavity and around the mandrel from the inlet end to the outlet end; and a mandrel stabilizer fixedly positioned downstream from the inlet end and which comprises a plurality of elongated members spaced around the mandrel, wherein each elongated member has an end in contact with the outer surface of the mandrel.

According to another aspect of the invention, there is provided a molding method comprising: (a) providing a die having a mold cavity defined therein which extends from the inlet end to the outlet end of the die; (b) providing a mandrel which extends through the mold cavity from the inlet end to the outlet end; (c) passing resin impregnated fibers through the mold cavity and around the mandrel from the inlet end to the outlet end so as to at least partially consolidate the resin impregnated fibers; (d) heating the die during step (c); and (e) stabilizing the mandrel during step (c) by contacting an end of each of a plurality of fixedly positioned elongated members to the outer surface of the mandrel at a position downstream from the inlet end of the die, wherein the elongated members are spaced around the mandrel and wherein in step (c) the resin impregnated fibers pass around and along the mandrel at the position of the elongated members.

According to a preferred embodiment in which the resin impregnated fibers are pulled through the die to pultrude a hollow article, there is provided an additional "hot" die which receives partially consolidated resin impregnated fibers from the first "hot" die so as to pass through the mold cavity of the additional hot die, through a mandrel stabilizer in accordance with the invention, and finally into and through a "cooling" die.

Employing the mandrel stabilizer in accordance with the invention serves to stabilize and hold the mandrel in position during molding of the hollow article. It has been found that without such a mandrel stabilizer, the mandrel tends to wander from its desired central location within the mold cavity due to the effects of gravity and volumetric inconsistencies in the resin impregnated fibers. Such volumetric inconsistencies can lead to unequal volumes of resin impregnated fibers distributed around the mandrel so as to force the mandrel from its desired central location within the mold cavity. In accordance with the invention, the mandrel is held in position so as to produce hollow articles such as tubing with well centered bores therethrough.

DETAILED DESCRIPTION OF THE INVENTION

Figure 1:
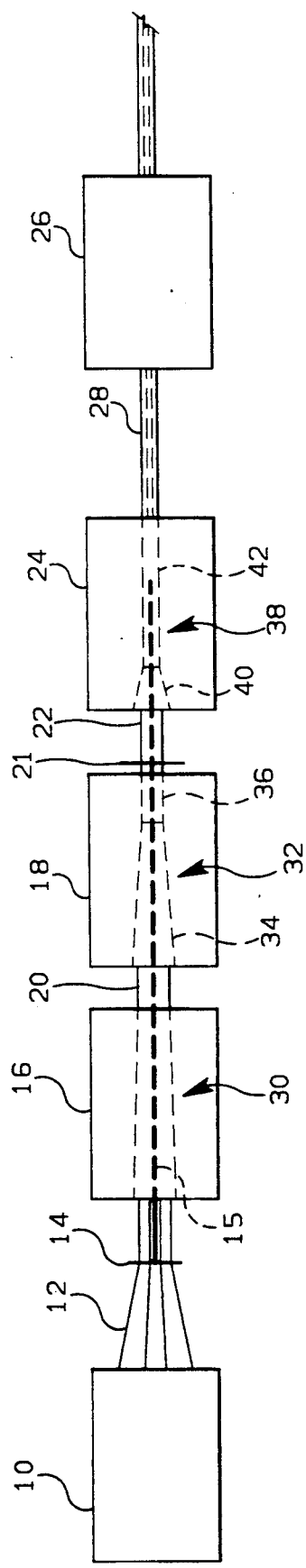
FIG. 1 is a diagramatic view of one embodiment of the invention during pultrusion of a tube.

Referring to FIG. 1, this figure diagramatically illustrates a pultrusion apparatus which includes: a creel 10 for supplying impregnated fibers as indicated at 12; a guide or preformer 14 for guiding and converging the resin impregnated fibers; a mandrel 15 which generally longitudinally extends from preformer 14; a "hot" die 16 which receives the resin impregnated fibers at its inlet end; a "hot" die 18 which receives the partially consolidated resin impregnated fibers 20 at its inlet end from the outlet end of die 16; a mandrel stabilizer 21 positioned closely adjacent to the outlet end of die 18 so as to receive the further consolidated resin impregnated fibers 22 therethrough; and "cooling" die 24 which receives the further consolidated resin impregnated fibers 22 at its inlet end after having passed through the mandrel stabilizer 21; and a pulling means 26, of the type well known to those skilled in the art, for pulling the finally consolidated tube 28 from the outlet end of die 24, thus pulling the resin impregnated fibers from creel 10 and through the various dies and the mandrel stabilizer. The bore through tube 28 is indicated by broken lines.

The resin impregnated fibers as supplied from creel 10 can be in the form of multiple "prepreg" tapes which comprise the resin impregnated fibers. Alternatively, the pultrusion apparatus can be provided with means to impregnate strands of fibers with resin. For example, fiber strands can be pulled through a resin bath where the fibers are impregnated with resin, after which the resin impregnated fibers are pulled through a suitable dryer and into and through the various dies. Such a system which includes a resin bath, dryer, etc. is described in U.S. Pat. No. 4,680,224 of O'Connor.

With respect to the mold cavities defined by the various dies, die 16 defines a mold cavity 30 which tapers from an inlet diameter to a smaller outlet diameter and which receives mandrel 15 therethrough from the inlet end to the outlet end of die 16. Die 18 defines a mold cavity 32 which receives mandrel 15 therethrough from the inlet end to the outlet end of die 18. Mold cavity 32 includes a first, tapered portion 34 which tapers from an inlet diameter to a second portion 36 of substantially constant cross-sectional area. Second portion 36 extends to the outlet end of die 18 and is preferably shorter in length than the first, tapered portion 34. Die 24 preferably defines a mold cavity 38 which includes a first, tapered portion 40 which tapers from an inlet diameter to a second portion 42 of substantially constant cross-sectional area. The second portion 42 extends to the outlet end of die 24 and is preferably longer than the first, tapered portion 40. As shown, mandrel 15 does not extend completely through mold cavity 38 but instead extends from the inlet end of die 24 to the end of the mandrel at a position within second portion 42 of mold cavity 38. It is preferred that mandrel 15 extend completely through tapered portion 40, in which final consolidation takes place, and into portion 42 to the minimum extent possible to minimize frictional drag on the consolidated resin impregnated fibers as they pass along and around mandrel 15. Mandrel 15 need not extend into the area of portion 42 where the finally consolidated resin impregnated fibers are sufficiently cool to retain their desired tubular shape without the aid of mandrel 15.

Line speed through the various dies generally ranges from about 1 to about 50 inches/minute. The line speed is dependent at least in part upon factors such as the size, geometry and composition of the pultruded article. By way of example, an increase in the size of the pultruded article is associated with a decrease in the maximum achievable line speed.

In regard to temperatures of the various dies, the temperature of each of the "hot" dies 16 and 18 is preferably sufficient to soften the resin sufficiently to achieve the desired consolidation within the respective mold cavities. Typically, dies 16 and 18 will be maintained at a temperature in the range of from about 10° C. to about 100° C. above the melting point of the particular resin employed. A temperature differential is preferably maintained between the inlet and outlet ends of "cooling" die 24. The inlet end of die 24 is preferably maintained at a temperature below the softening point of the resin but considerably above ambient temperature. Final consolidation of the resin impregnated fibers can be achieved in the tapered portion 40 of mold cavity 38 because the cooling of the partially consolidated resin impregnated fibers causes the material to shrink and pull away from the surfaces defining the mold cavity. The outlet end of die 24 is preferably maintained at a temperature considerably less than the inlet end of die 22 and near ambient temperature if possible.

In regard to the resin employed in accordance with the invention, thermoplastic resins are particularly preferred due to their excellent reformability characteristics. This is particularly important in the present invention which involves passing of the resin impregnated fibers through and around elongated members of the mandrel stabilizer, as will be discussed further below.

Suitable thermoplastic resins useful in the invention are well known and include polyolefins, polyesters, polycarbonates, polyamides and aromatic sulfide polymers from the poly(arylene sulfide) (PAS) family. The last mentioned PAS polymers are particularly preferred in accordance with the invention and are noted for their excellent chemical resistance, good thermostability, and physical strength. A particular PAS polymer, poly(phenylene sulfide) (PPS), has been employed with good results. One type of suitable poly(phenylene sulfide) is a commercial engineering thermoplastic resin that is semi-crystalline in nature with a glass transition temperature of about 85° C. and a crystalline melting point of about 285° C. sold under the trademark RYTON ® by Phillips 66 Company of Bartlesville, Okla.

Where poly(phenylene sulfide) is used as the resin, dies 16 and 18 are preferably maintained at a temperature in the range of about 310° C. to about 400° C. The inlet end of die 24 is preferably maintained at a temperature of about 130° C. to about 200° C., and the outlet end of die set 22 is preferably maintained at a temperature of about 20° C. to about 100° C. and most preferably about 20° C. to about 60° C.

The fiber reinforcement suitable for use in the present invention can be selected from a wide variety of materials. The fiber selected should not decompose or melt at or below processing temperature for the resin selected. For poly(arylene sulfide) resins, glass, carbon and aramid fibers are most preferred.

With respect to fiber orientation, it is preferred that the fibers of the resin impregnated fibers as passed through the various mold cavities and mandrel stabilizer are substantially unidirectionally aligned in the pultrusion direction generally parallel to the longitudinal axis of the mandrel. Such a fiber orientation is conducive to easy and undamaging passage of the resin impregnated fibers through mandrel stabilizer 21.

Figure 2:
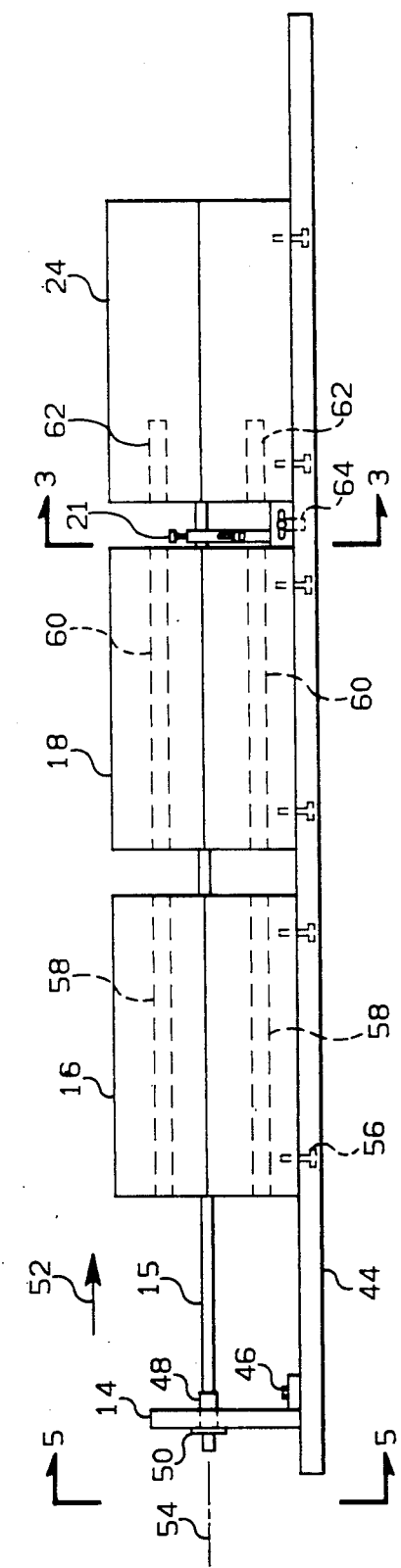
FIG. 2 is a side view of a preformer, three dies, and a mandrel stabilizer connected to a mounting plate in accordance with one embodiment of the invention.

Referring now to FIG. 2, there is shown an arrangement whereby particular components of the apparatus of FIG. 1 are prealigned and mounted upon a mounting plate 44.

As shown, preformer 14 is fixedly connected to mounting plate 44 by means of bolts 46, only one of which is shown in FIG. 2. Mandrel 15, which is preferably composed of carbon steel, is connected to preformer 14 by means of a bushing 48. Bushing 48 is fixedly connected, such as by welds, to mandrel 15 and extends through an opening in preformer 14. Bushing 48 has a flange 50 at one end which is larger than the opening through preformer 14. Although flange 50 is preferably not attached to preformer 14, flange 50 effectively fixedly positions mandrel 15 during pultrusion due to the force exerted upon mandrel 15 and bushing 48 during pultrusion in the direction indicated at 52. Direction 52 is shown as being generally parallel to the longitudinal axis 54 of mandrel 15.

Each of dies 16, 18 and 24 are fixedly connected to mounting plate 44 by means of a plurality of bolts as shown in broken lines at, for example, 56 which are preferably recessed into the bottom of mounting plate 44. Each of dies 16, 18 and 24 comprise a pair of matable mold sections which when mated together define the mold cavities which are shown in FIG. 1.

Heating of dies 16 and 18 is provided by longitudinally extending cartridge heaters such as those shown in broken lines at 58 and 60, respectively. Electrical leads to such cartridge heaters are not shown in FIG. 2 for clarity of illustration. Heating of die 24 is provided by cartridge heaters 62 which extend only partially through die 24 from the inlet end thereof. Heaters 62 are provided to heat tapered portion 40 of mold cavity 38, as shown in FIG. 1, where final consolidation takes place. The consolidated resin impregnated fibers merely cool in the remainder of mold cavity 38.

Mandrel stabilizer 21 is fixedly connected to mounting plate 44 by means of bolts 64, only one of which is shown in FIG. 2 in broken lines. Mandrel stabilizer 21 is preferably fixedly positioned outside of die 18 and closely adjacent to the outlet end thereof. Such a position of stabilizer 21 is advantageous for essentially two reasons. First, the resin impregnated fibers exiting the outlet end of die 18 are at a sufficiently high temperature so as to easily pass through mandrel stabilizer 21. Second, such positioning of mandrel stabilizer 21 optimizes the mechanical stability of mandrel 15.

Figure 3:
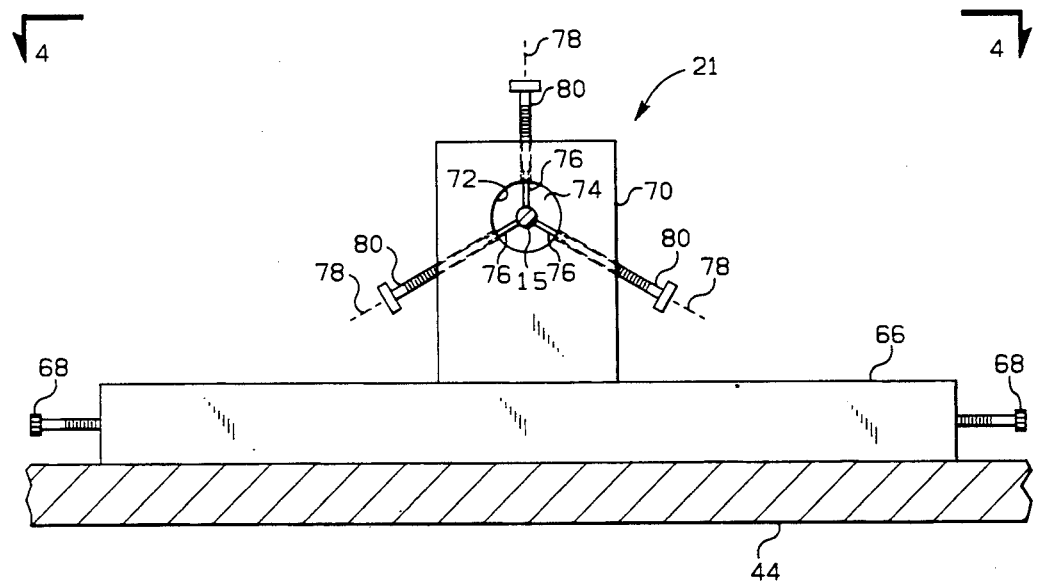
FIG. 3 is a view of the mandrel stabilizer shown in FIG. 2 as viewed along line 3—3.

Referring now to FIG. 3, there is shown a closeup view of mandrel stabilizer 21. Mandrel stabilizer 21 is preferably connected to a stabilizer base 66 by means of, for example, suitable welds, and mandrel base 66 is fixedly connected to mounting plate 44 by means (bolts 64) shown in FIGS. 2 and 4. Lateral adjustment bolts 68 extend from each side of stabilizer base 66 and are further shown and described with reference to FIG. 4.

Mandrel stabilizer 21 includes a sleeve member 70 which is fixedly connected by welds, for example, at its lower end to stabilizer base 66. As used herein and in the appended claims, the term "sleeve" does not imply any particular shape, but only means that such a member fits over another member. In the illustrated embodiment, sleeve member 70 has an inner surface 72 and an opening defined by the inner surface which receives mandrel 15 generally longitudinally therethrough. An annular space 74 is accordingly defined between the outer surface of mandrel 15 and the inner surface 72 of sleeve member 70. A plurality (in this case three) of elongated members as shown at 76 generally radially extend within annular space 74 from inner surface 72 to corresponding ends which are in contact with the outer surface of mandrel 15. Each of elongated members 76 has a corresponding longitudinal axis as indicated at 78. Elongated members 76 are spaced around mandrel 15 in the illustrated embodiment such that the longitudinal axes 78 are spaced at intervals of about 120°.

Preferably, each elongated member 76 has associated therewith an adjustment member 80 which is integrally connected to its corresponding elongated member so as to be generally coaxial therewith. Most preferably, adjustment member 80 and its associated elongated member 76 is constructed by simply "turning" and/or filing the lower portion of a bolt to produce the elongated member. In this manner, adjustment member 80 and elongated member 76 constitute a single piece which optimizes strength of the connection between the adjustment member 80 and its elongated member 76. Preferably, the end of elongated member 76 which is contact with the outer surface of mandrel 15 is relatively flat rather than pointed so as to make maximum contact with the outer surface of mandrel 15. As shown, each adjustment member 80 has screw threads which are threadedly received by sleeve member 70 such that each corresponding elongated member 76 is radially adjustable in position within annular space 74. This allows for adjustment to fit different sizes of mandrels.

Figure 4:
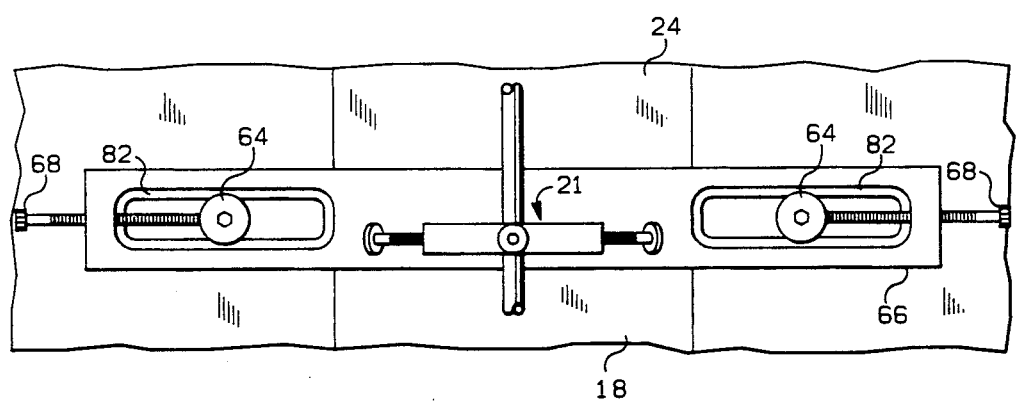
FIG. 4 is a view of the mandrel stabilizer shown in FIG. 3 as viewed along 4—4.

Referring now to FIG. 4, there is shown a top view of mandrel stabilizer 21 and stabilizer base 66. Also shown in FIG. 4 is die 18 having its outlet end in abutting contact with stabilizer base 66, and also die 24 having its inlet end in abutting contact with stabilizer base 66. Lateral adjustment bolts 68 are threadedly received at each side of stabilizer base 66 so as to be engageable with corresponding mounting bolt 64. Since mounting bolts 64 are recessed within stabilizer base 66, each such bolt in the illustrated embodiment has an opening to receive an Allen wrench. Each mounting bolt 64 is received by a corresponding elongated slot 82 in stabilizer base 66. Slots 82 enable large lateral adjustments of the position of stabilizer base 66, whereas fine lateral adjustment can be provided by screwing or unscrewing lateral adjustment bolts 68. Of course, such adjustments are made after first slightly loosening bolts 64.

With respect to materials used in mandrel stabilizer 21, elongated members 76 can be composed of any material which is sufficiently strong to withstand, without bending, the drag exerted upon the elongated members by the resin impregnated fibers, and which will withstand the temperature of the resin impregnated fibers as they exit the outlet end of die 18. By way of example, metals such as steel or brass can be used for elongated member 76 where poly (arylene sulfide) impregnated fibers are being pultruded. In this case, the resin impregnated fibers as they pass from the outlet end of die 18 are exposed to a die temperature of about 310° C. to about 400° C. Any sufficiently strong materials, such as steel, can be employed in sleeve member 70, as well as adjustment members 80 and stabilizer base 66.

With respect to preferred configurations of elongated members 76, it is preferred that such elongated members be generally cylindrical in shape to minimize friction with the resin impregnated fibers, and that such elongated members have diameters which are sufficiently large to withstand the drag exerted upon them by the resin impregnated fibers but also sufficiently small to avoid an undesirable degree of heat transfer from the resin impregnated fibers to the elongated members. In this regard, the elongated members can act as a heat sink and decrease the temperature of the resin impregnated fibers. By way of example, where a tubular article is being pultruded which has an inner diameter in the range of about 1/16 inch to about ½ inch and an outer diameter in the range of about ⅛ inch to about 1 inch, a typical diameter of an elongated member 76 is in the range of about 1/16 inch to about 3/16 inch. In order to minimize friction it is also preferred that the surfaces of elongated member 76 be polished.

Figure 5:
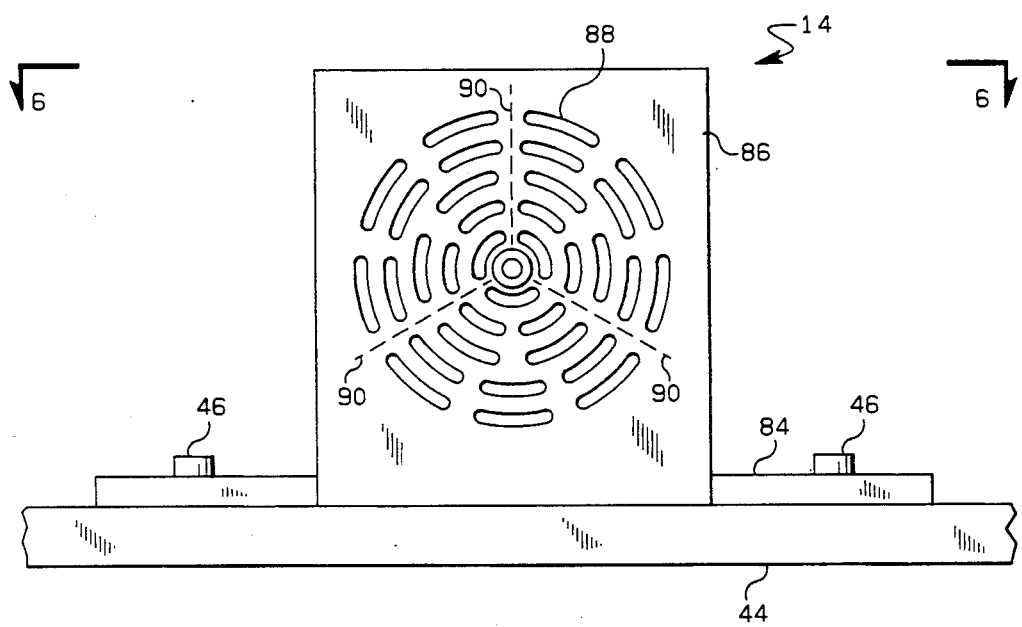
FIG. 5 is a view of the preformer shown in FIG. 2 as viewed along line 5—5.

Referring now to FIG. 5, there is shown a closeup view of preformer 14 which is fixedly connected to mounting plate 44 by means of preformer base 84 and bolts 46. Preformer base 84 in the illustrated embodiment is connected to preformer 14 by suitable means, such as welds. Preformer 14 comprises a plate 86, composed of any suitably strong material such as steel, which has a plurality of openings 88 for receiving the resin impregnated fibers therethrough. The openings 88 in the illustrated embodiment are generally shaped as slots and are designed to receive impregnated fibers in the form of prepreg tapes. Each opening 88 can typically receive about one to about three tapes therethrough. The plurality of openings 88 are divided into three sets of openings separated from one another by three imaginary linear boundaries as indicated at 90. Such boundaries 90 can be seen to intersect at the approximate center of the mandrel and are spaced from one another at intervals of about 120° C. It can be seen by comparing FIGS. 3 and 5 that the projection of the longitudinal axis of each elongated member 76 in a direction generally parallel to the mandrel longitudinal axis and onto preformer 14 generally lies along and corresponds to a corresponding linear boundary 90. Resin impregnated fibers passing through the three sets of openings 88 are effectively separated into three bundles which are introduced into and through the various dies. Such bundles of resin impregnated fibers are preferably only weakly consolidated along planes which intersect linear boundaries 90 as they exit the outlet end of die 18 and pass through and around the elongated members 76 of stabilizer 21. In this manner, resin impregnated fibers are easily separated upon passing through stabilizer 21. Separated resin impregnated fibers consolidate back together on passing through the tapered portion 40 of mold cavity 38 in die 24.

Figure 6:
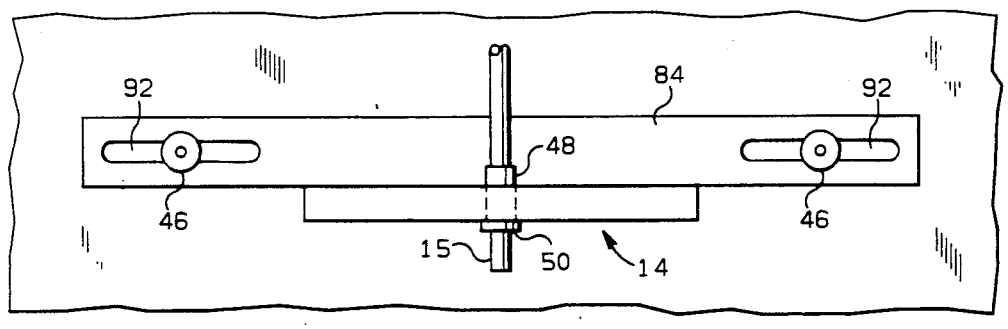
FIG. 6 is a view of the preformer shown in FIG. 5 as viewed along line 6—6.

Referring now to FIG. 6, a top view of preformer 14 and preformer base 84 is shown. This FIGURE also shows a top view of bushing 48 and associated flange 50, as well as mandrel 15 which extends through preformer 14 and bushing 48. Slots 92 in preformer base 84 receive bolts 46 therethrough and enable lateral adjustment of preformer base 84 and preformer 14.

EXAMPLE

The purpose of this example is to demonstrate the pultrusion of high quality tubing with a well centered bore in accordance with the invention. This example should not be construed to limit the invention in any manner.

The apparatus of this example was substantially similar to that shown in FIGS. 1-6. The mandrel 15 was a carbon steel "drill rod", and the material defining the mold cavities was composed of H13 steel alloy. Each elongated member 76 and its associated adjustment member 80 was a single brass piece which was made from a brass screw by "turning" its end portion in a lathe, followed by manual filing to result in a polished surface. Sleeve member 70 and preformer 14 were constructed of 1018 steel alloy. Important dimensions of the apparatus are summarized in Table I.

TABLE I

| Item | Dimension |
| --- | --- |
| Diameter of mandrel 15 | 0.093 inch |
| Diameter of each elongated member 76 | 0.062 inch |
| Length of mold cavity 30 | 8 inches |
| Inlet diameter of mold cavity 30 | 1.500 inches |
| Outlet diameter of mold cavity 30 | 0.690 inch |
| Length of mold cavity 32 | 8 inches |
| Length of tapered portion 34 | 7 inches |
| Length of portion 36 of constant cross section | 1 inch |
| Inlet diameter of mold cavity 32 | 0.776 inch |
| Outlet diameter of mold cavity 32 | 0.532 inch |
| Length of mold cavity 38 | 12 inches |
| Length of tapered portion 40 | 2 inches |
| Length of portion 42 of constant cross section | 10 inches |
| Inlet diameter of mold cavity 38 | 0.576 inch |
| Outlet diameter of mold cavity 38 | 0.506 inch |

The puller 26 employed in this example was a Pulstar 3008 pulling machine commercially available from Pultrusion Technology, Inc. of Twinsburg, Ohio. This pulling machine includes two grippers for pulling the pultruded article.

The resin impregnated fibers were supplied to the inlet end of die 16 as AVTEL ® unidirectional prepreg tapes (available from Phillips 66 Company of Bartlesville, Okla.) comprising approximately 70 weight percent unidirectionally aligned glass fibers and 30 weight percent RYTON ® poly(phenylene sulfide). Referring to FIG. 5, only the three innermost openings 88 of preformer 14 were employed. One ½ inch wide, 0.008 inch thick tape and one ⅜ inch wide, 0.008 inch thick tape were passed through each of the two upper openings, whereas two ½ inch, 0.008 inch thick tapes and one ⅜ inch, 0.008 inch thick tape were passed through the lower opening. Thus, a total of four ½ inch tapes and three ⅜ inch tapes were fed through the preformer and into the inlet end of die 16. Line speed was maintained at about 26.3 inches/minute.

The temperature of hot dies 16 and 18 were maintained at about 390° C. and 375° C., respectively, as measured by thermocouples at their outlet ends closely adjacent to the mold cavity. A temperature differential was maintained between the inlet end (153° C.) and the outlet end (91° C.) of die 24.

During the run, some build-ups of broken fibers occurred at the elongated members 76. However, cleaning was required only at infrequent intervals (every 40 to 50 feet of tubing) during pultrusion.

About 230 feet of tubing (about 1/10 inch I.D. and 3/16 O.D.) was produced, which was cut into forty-two 5.5 foot long tubes. Each tube was found to have a well centered bore and exhibited no visible defects such as voids or splits.

At the end of this run, the adjustment and elongated members were removed from the stabilizer during pultrusion. The mandrel as had been accurately positioned by the elongated members did not stay in this position but instead immediately fell to the bottom of the tube, thus producing seriously defective tubing with an off-center bore. This clearly demonstrates the effectiveness of the inventive stabilizer.

Obviously, many modifications and variations of the present invention are possible in light of the above teachings. It is therefore to be understood that within the scope of the appended claims, the invention may be practiced otherwise than as specifically described.

That which is claimed is:

1. A molding method comprising:
 (a) providing a die having an inlet end, an outlet end, an outlet end, and a mold cavity defined therein which extends from said inlet end to said outlet end;
 (b) providing a mandrel, having an outer surface, which extends through said mold cavity from said inlet end to said outlet end;
 (c) passing resin impregnated fibers through said mold cavity and around said mandrel from said inlet end to said outlet end so as to at least partially consolidate said resin impregnated fibers;
 (d) heating said die during step (c); and
 (e) stabilizing said mandrel during step (c) by contacting an end of each of a plurality of fixedly positioned elongated members to the outer surface of said mandrel at a position outside of said die and closely adjacent to said outlet end, wherein said elongated members are spaced around said mandrel and wherein in step (c) said resin impregnated fibers pass around and along said mandrel at the position of said elongated members.

2. A method as recited in claim 1 wherein each said elongated member is radially adjustable in position, said method further comprising adjusting the positions of said elongated members before step (c) such that said ends of said elongated members are in contact with the outer surface of said mandrel.

3. A method as recited in claim 2, further comprising: supplying said resin impregnated fibers from a supply means; passing said resin impregnated fibers from said supply means to and through a preformer and from the preformer to said inlet end.

4. A method as recited in claim 3 wherein said mandrel has a longitudinal axis, each said elongated member has a longitudinal axis, and said plurality of elongated members comprises n elongated members, where n is an integer, said preformer comprising a plate having a plurality of openings for receiving said resin impregnated fibers therethrough which are divided into n sets of openings separated from one another by n imaginary linear boundaries, said elongated members and said preformer being relatively positioned during steps (c) and (e) such that the projection of the longitudinal axis of each said elongated member in a direction parallel to said mandrel longitudinal axis and onto said preformer generally lies along and corresponds to a corresponding linear boundary.

5. A method as recited in claim 4 wherein n=3 and wherein the longitudinal axes of said elongated members and also said linear boundaries are spaced around said mandrel at intervals of about 120°.

6. A method as recited in claim 5 wherein during steps (c) and (e) said mandrel is connected to said preformer.

7. A method as recited in claim 6 wherein said die is hereafter referred to as a first die having corresponding first inlet and outlet ends and a first mold cavity, and wherein there is further provided a second die having second inlet and outlet ends and a second mold cavity which extends therebetween and which receives said mandrel therethrough, said second die being positioned between said preformer and said first die, wherein said method further comprises: passing said resin impregnated fibers from said preformer to said second inlet end so as to pass through said second mold cavity and from said second outlet end to said first inlet end; and heating said second die.

8. A method as recited in claim 7, wherein a stabilizer comprises said elongated members and wherein there is further provided a third die having third inlet and outlet ends and a third mold cavity which extends therebetween and which receives said mandrel at least partially therethrough, said third die being positioned such that said stabilizer is between said first and third dies and wherein said method further comprises passing said resin impregnated fibers from said first outlet end, through said stabilizer, and into said third inlet end.

9. A method as recited in claim 8, wherein said resin impregnated fibers are passed through the respective mold cavities of said dies by pulling said resin impregnated fibers as a molded hollow article from said third outlet end after having passed through said third mold cavity, whereby said resin impregnated fibers are pulled from said supply means and through said dies.

10. A method as recited in claim 9 wherein said resin comprises a thermoplastic.

11. A method as recited in claim 10 wherein said thermoplastic is poly(arylene sulfide).

12. A method as recited in claim 11 wherein said thermoplastic is poly(phenylene sulfide).

13. A method as recited in claim 11 wherein said fibers are selected from the group consisting of carbon fibers, glass fibers and aramid fibers.

14. A method as recited in claim 13 wherein said fibers are unidirectionally aligned in a direction generally parallel to the longitudinal axis of said mandrel.

15. A method as recited in claim 14 wherein, during step (c), the temperature of said first die is in the range of about 310° C. to about 400° C., the temperature of said second die is in the range of about 310° C. to about 400° C., and said third die has its inlet end at a temperature in the range of about 130° C. to about 200° C. and its outlet end at a temperature in the range of about 20° C. to about 100° C.

* * * * *